US008359571B2

(12) United States Patent
Clemm et al.

(10) Patent No.: US 8,359,571 B2
(45) Date of Patent: Jan. 22, 2013

(54) COMPUTER METHOD AND APPARATUS FOR ACTIVITY-BASED VERSION SELECTION IN A CONFIGURATION MANAGEMENT SYSTEM

(75) Inventors: Geoffrey M. Clemm, Concord, MA (US); Bryan P. Douros, Farmingham, MA (US); Nathaniel W. Mishkin, Nashua, NH (US); Carol D. Yutkowitz, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 1229 days.

(21) Appl. No.: 11/312,995

(22) Filed: Dec. 19, 2005

(65) Prior Publication Data

US 2007/0143752 A1 Jun. 21, 2007

(51) Int. Cl.
*G06F 9/44* (2006.01)
(52) U.S. Cl. ........................................... 717/120
(58) Field of Classification Search .................. 707/1, 9, 707/203; 717/105, 101, 162, 175, 120–124; 364/200
See application file for complete search history.

(56) References Cited

U.S. PATENT DOCUMENTS

| | | | |
|---|---|---|---|
| 4,853,843 A * | 8/1989 | Ecklund | 1/1 |
| 5,278,979 A * | 1/1994 | Foster et al. | 707/203 |
| 5,574,898 A * | 11/1996 | Leblang et al. | 707/1 |
| 5,649,200 A | 7/1997 | Leblang et al. | |
| 5,701,472 A * | 12/1997 | Koerber et al. | 707/203 |
| 5,898,872 A | 4/1999 | Richley | |
| 6,112,024 A | 8/2000 | Almond et al. | |
| 6,385,768 B1 * | 5/2002 | Ziebell | 717/121 |
| 6,442,754 B1 | 8/2002 | Curtis | |
| 6,536,037 B1 | 3/2003 | Guheen et al. | |
| 6,698,013 B1 | 2/2004 | Bertero et al. | |
| 6,701,514 B1 | 3/2004 | Haswell et al. | |
| 6,934,716 B2 | 8/2005 | Bradley et al. | |
| 7,069,547 B2 | 6/2006 | Glaser | |
| 7,133,874 B2 | 11/2006 | Hill et al. | |
| 7,191,435 B2 | 3/2007 | Lau et al. | |
| 7,409,676 B2 | 8/2008 | Agarwal et al. | |
| 7,480,893 B2 | 1/2009 | Berenbach et al. | |
| 7,490,319 B2 | 2/2009 | Blackwell et al. | |
| 7,735,062 B2 * | 6/2010 | de Seabra e Melo et al. | 717/120 |
| 2003/0084425 A1 | 5/2003 | Glaser | |
| 2003/0120678 A1 | 6/2003 | Hill et al. | |
| 2003/0121024 A1 | 6/2003 | Hill et al. | |

(Continued)

OTHER PUBLICATIONS

Chen, Y. et al., "Specification-based Regression Test Selection with Risk Analysis," *Proceedings of the 2002 Conference of the Centre for Advanced Studies on Collaborative Research*, Toronto, Canada (14 pp.).

(Continued)

*Primary Examiner* — Tuan A Vu
(74) *Attorney, Agent, or Firm* — Hamilton, Brook, Smith & Reynolds, P.C.

(57) ABSTRACT

A computer method, system and apparatus for selecting version of a software program artifact includes history means and processor means. The history means indicate (a) a baseline version of each artifact in a given plurality of artifacts forming a subject software program configuration, and (b) respective change-set information per artifact. Different change sets correspond to different versions of the artifacts. The processor means determine version of an artifact in the subject software program configuration using the indicated baseline versions and change-set information. The processor means enable the configuration management system to display the determined version of the artifact to a user.

20 Claims, 8 Drawing Sheets

U.S. PATENT DOCUMENTS

| | | |
|---|---|---|
| 2003/0204538 A1 | 10/2003 | Keene |
| 2004/0268302 A1 | 12/2004 | Srivastava et al. |
| 2005/0172306 A1 | 8/2005 | Agarwal et al. |
| 2005/0210445 A1 | 9/2005 | Gough et al. |
| 2006/0010425 A1 | 1/2006 | Willadsen et al. |
| 2006/0130040 A1 | 6/2006 | Subramanian et al. |

OTHER PUBLICATIONS

Hayashi, K. et al., Temporally-threaded Workspace: A Model for Providing Activity-based Perspectives on Document Spaces, *Hypertext 98: Ninth ACM Conference on Hypertext and Hypermedia*, Pittsburgh, PA, Jun. 20-24, 1998 (pp. 87-96).

Estublier, J. et al., "Impact of the Research Community on the Field of Software Configuration Management, Summary of an Impact Project Report," *ACM SIGSOFT, Software Engineering Notes*, vol. 27, No. 5, Sep. 2002 (pp. 31-39).

Conradi, R. and B. Westfechtel, "Version Models for Software Configuration Management," *ACM Computing Surveys*, vol. 30, No. 2, Jun. 1998 (pp. 232-241).

Micallef, J. and G.M. Clemm, "The Asgard system: activity-based configuration management" in *Software Configuration Management, ICSE 96 SCM-6 Workshop*, Berlin, Germany, Mar. 25-26, 1996, Selected Papers, pp. 175-186.

Cohen, E.S. et al., "Version management in Gypsy," *SIGSOFT Software Engineering Notes*, vol. 13, No. 5, Nov. 1998 (pp. 201-215).

Conradi, R. and B. Westfechtel, "Version Models for Software Configuration Management," ACM Computing Surveys, vol. 30, No. 2, Jun. 1998 (pp. 232-282).

Lindvall, M., et al., "Traceability Aspects of Impact Analysis in Object-Oriented Systems," *Journal of Software Maintenance, Research and Practice*, 10:37-57 (1998).

\* cited by examiner

COMPUTER METHOD AND APPARATUS FOR ACTIVITY-BASED VERSION SELECTION IN A CONFIGURATION MANAGEMENT SYSTEM

BACKGROUND OF THE INVENTION

Software development is typically performed as group projects. A subject software system is developed through design efforts, test efforts, implementation efforts and maintenance efforts. There may be different groups and different group members participating in each of these efforts. Throughout these efforts and among the work group members, various modeling and other development tools are used for increased communication and consistency in developing the subject software system. A software configuration management system is one such tool.

Software configuration management systems allow teams of users (software developer/engineer) to work with artifacts of a subject software system. An "artifact" is the persistent result of work done by a-user, typically persisted in a file system such as a model and source code.

Software configuration management (SCM) systems must provide a way for users to configure their work areas to select appropriate versions of the artifacts (e.g., files) with which they are working. Traditional SCM systems focus the configuration of work areas on the selection of individual artifacts, using file names, version numbers or patterns of each to select the appropriate versions.

SUMMARY OF THE INVENTION

The present invention addresses the problems of the prior art and provides an activity-based version (ABVS) configuration management system. In a preferred embodiment, the invention employs artifact history means and processor means. The artifact history means indicate (a) a baseline version of each artifact in a given plurality of artifacts forming a subject software program configuration, and (b) respective change-set information per artifact. Different change sets correspond to different versions of the artifacts. The processor means determine version of an artifact in the subject software program configuration using the indicated baseline versions and change-set information. The processor means enables the configuration management system to display the determined version of the artifact to a user.

The processor means (routine) is preferably rules-based and includes gap selection error resolution and conflict selection error resolution.

Embodiments include computer method, apparatus, and program product of selecting a software program artifact version. Further embodiments include an artifact selector for a configuration management system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 8:
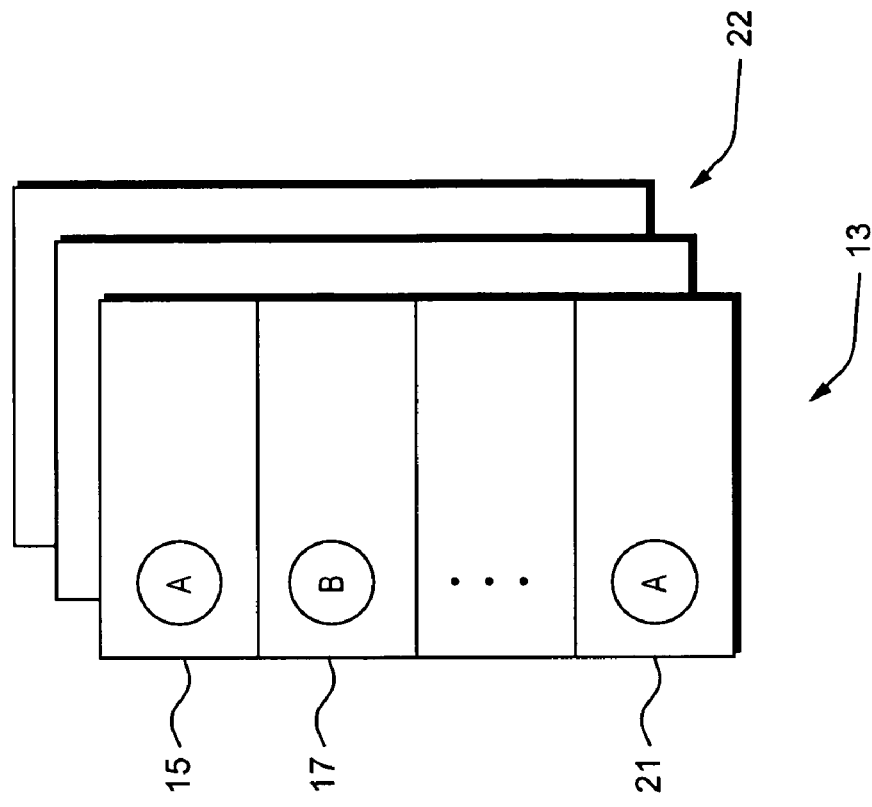
FIG. 8 is a block diagram of one embodiment of the present invention.
Figure 8:
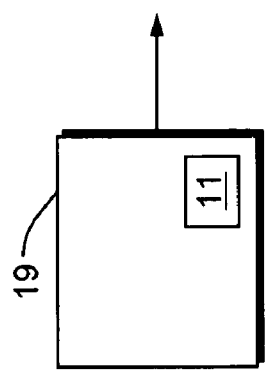

Illustrated in FIG. 8 is a subject software program 13 formed of one or more artifacts 15, 17, 21. Each artifact 15, 17, 21 has respective versions A, B, etc. Thus one configuration 22 of subject software program 13 employs version A of artifact 15, version B of artifact 17 and version A of artifact 21. Other configurations 22 of subject software program 13 use other versions of artifacts 15, 17, 21. A configuration management system 19 enables users to produce and work with (e.g., edit, test, redesign, etc.) such different configurations 22 of subject software program 13. Thus, a major part of configuration management system 19 is the version selector 11 which selects the proper software program artifact version at the various times of user operation on/interaction with a subject program 13 and its various configurations 22. The version selector 11 supports the workspace of a user and contents displayed therein as further explained below. The present invention is an improved or novel version selector 11 as heretofore unachieved by the prior art.

The present invention provides activity-based version selection (ABVS) in configuration management system 19. The invention system 11 abstracts the selection method to better express the configuration 22 of a work area in terms of the projects with which the user is working along with the logical units of incremental work he is doing.

To understand the invention ABVS, Applicants first define some terms.

An "artifact" is a persistent result of work done by a user, typically persisted in a file system such as models and source code.

An "activity" is used to track the results of work done by a user. The "change-set" of an activity is the set of changes to artifacts made by the practitioner to perform that activity.

A "project" is used to group related sets of artifacts and related sets of activities. A project is also used to group related sets of projects which are called "sub-projects" of that project.

A "baseline" is a persistent state of a project which identifies versions of each artifact in the project as well as which other projects are sub-projects of the project. The persistent state of the sub-project relationship is called a "sub-baseline".

A "workspace" is used to define the work environment of a user—to contain the artifacts required by that user and the activities that track the results of performing those tasks. A workspace is said to "accept" the project baselines and activity change-sets that define its configuration.

The basic motivation behind the present invention ABVS is that it is based on objects that should seem intuitive to users: baselines of projects are "what I'm starting with" and change-sets are natural units of work representing deltas from those baselines. ABVS allows users to specify a working environment based on a specification that at a high level says "I want to see the versions in baselines of these projects and their sub-projects combined with the changes indicated by the following change-sets."

While some SCM systems provide an activity or change-set mechanism for organizing work, none combine activity information with project information to select versions, nor use the aggregation of projects via a sub-project relationship to select versions. The present invention ABVS does both. Thus embodiments of the present invention combine change-sets and baselines to define a configuration as will be made clear below.

One ABVS scenario is where the workspace's configuration refers only to project baselines (and no change-sets) and no two baselines refer to versions in the same artifact history. In this case, the workspace (version selector 11) selects the versions specified in the baselines and displays the same to the end user.

Next, consider a less trivial ABVS scenario: a workspace configuration contains one project baseline that references version A of an artifact history, and one change-set that references version B, a direct successor of version A. In this case, the version selector 11 selects version B for the workspace (i.e., to display to the end user).

Things get more complicated when a workspace's configuration references multiple versions spread arbitrarily across a single artifact history graph. The question is: which version does the user want to see when accessing the artifact?

One multiple selection case has a clear answer. If the version referenced by the baseline and all the versions referenced by the change-sets are a contiguous sub-graph of the artifact history's version graph where exactly one version in the sub-graph does not have any successors, then the invention system 11 picks that one version. This case corresponds to the logical situation where the user has identified a set of baselines and change-sets that modify the same artifact history and logically "build on" each other.

Figure 1:
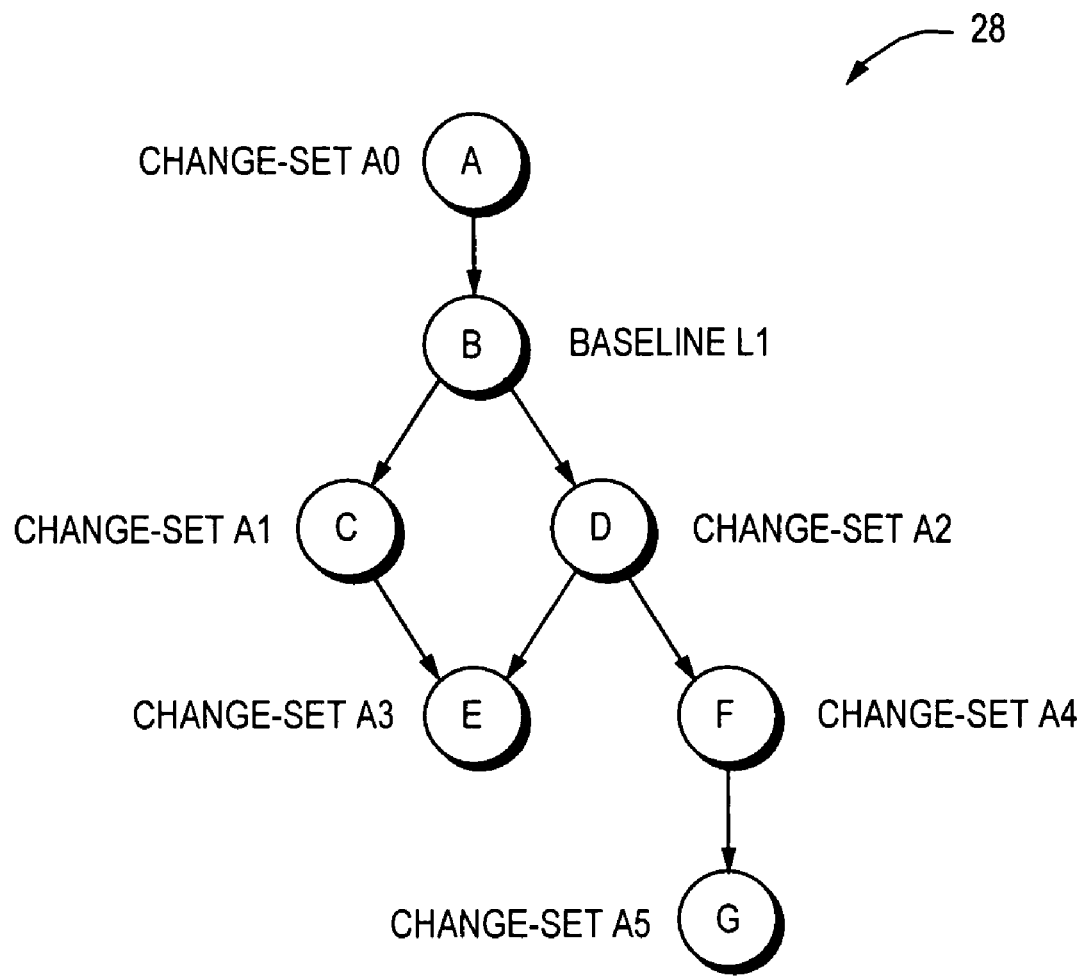
FIG. 1 is a schematic illustration of an artifact history graph.

For example, in the artifact history 28 illustrated in FIG. 1, baseline L1, change-set A2 and change-set A4 reference versions A, B, D and F, which from a contiguous sub-graph of the artifact history. Because versions A, B, D and F are a continuous sub-graph, a workspace that accepts these change-sets (A2 and A4) and baselines (L1) selects version F (utilizing version selector 11). The motivation here is: F is the product of work introduced in versions A, B, D (i.e., version F's predecessors) and F itself; baseline L1 represents the work done in versions A and B, change-set A2 represents the work done in version D, and change-set A4 represents the work done in version F. Altogether then these change-sets and baselines "add up" to the set of versions (A, B, D, F) that produced version F. So version F must be the correct version to select in a workspace that accepts those change-sets (A2 and A4) and baselines (L1).

To generalize a bit, a single version can be thought of as representing the sum of all the work done in that version and all its predecessor versions. By extension, a baseline can be thought of as representing the sum of all the work done in a set of versions of a set of artifact histories (one version and its predecessor versions per artifact history). Applicants say that in the invention ABVS method and technique (at 11) a baseline activates all these versions. A change-set, on the other hand, is thought of as representing only the work that was done to produce its set of versions; it activates only the versions in the change set (and not the predecessors of those versions).

The starting point for version selection in the invention ABVS system 11 is the calculation of the set of all versions activated by the workspace's configuration. After this point, how the versions got into the configuration, i.e., whether because of baselines or sub-baselines or because of change-sets, is irrelevant to the selection process. For ABVS system 11 to select a version, it must be possible to describe the activated version set as containing (and only containing) a single version and all its predecessor versions.

Figure 2:
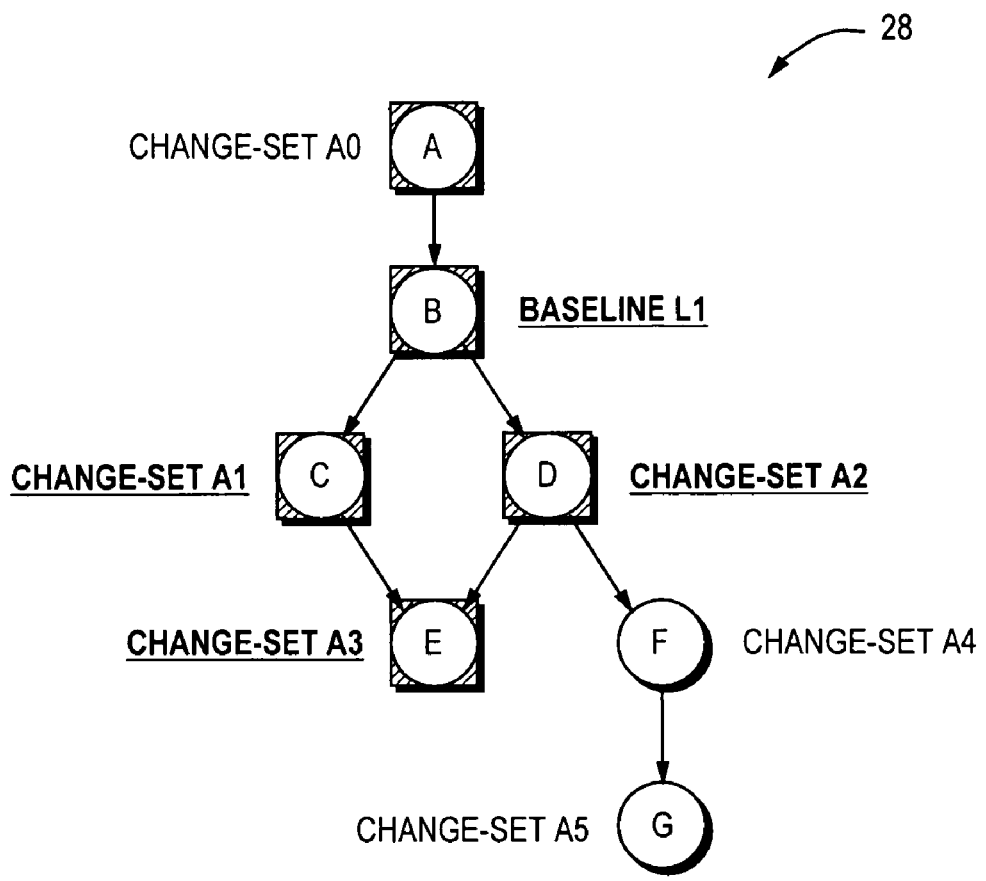
FIGS. 2-5 are schematic illustrations of version selection in the present invention.

With reference to FIG. 2 consider a more complex example. Suppose that the workspace accepts baseline L1, change-set A1, change-set A2 and change-set A3 (indicated in FIG. 2 by underlining). The activated version set (indicated by shaded circles) is thus the set containing versions, A, B, C, D and E or {A, B, C, D, E}. Where versions A, B, C, D and E form a continuous sub-graph, the activated version set can be described as version E and all its predecessors. As a result, the invention system 11 allows the workspace to select and display version E upon acceptance of base L1 and change sets A1, A2 and A3.

Selection Errors

Figure 3:
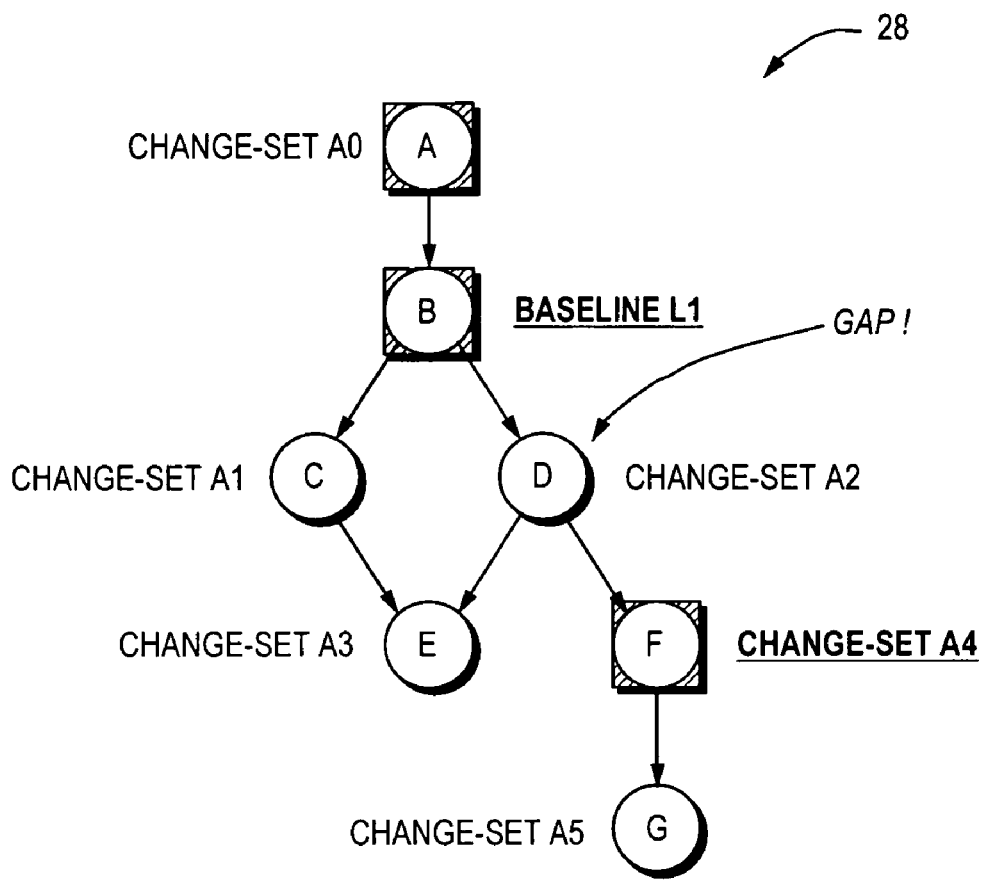

Referring to FIG. 3, consider a problematic example. Suppose that the workspace accepts baseline L1 and change-set A4. The subject change-sets and baseline in the configuration (underlined) produce the activated version set {A, B, F} (shaded). There is no one version in the graph that represents only the work done in this activated version set. Version F logically contains work done in version D, a version not activated by the subject change-sets A4 and baseline L1 and hence cannot be the version that the workspace/invention system 11 selects. Since this set of change-sets A4 and baselines L1 does not select all the predecessors of a single version (i.e., does not form a contiguous sub-graph), the configuration is invalid and the workspace is unable to select a version of the artifact history. Applicants call this a gap selection-error. When there are such gap errors, the invention system 11 provides to the user a list of change-sets that can be added to eliminate the gaps.

Figure 4:
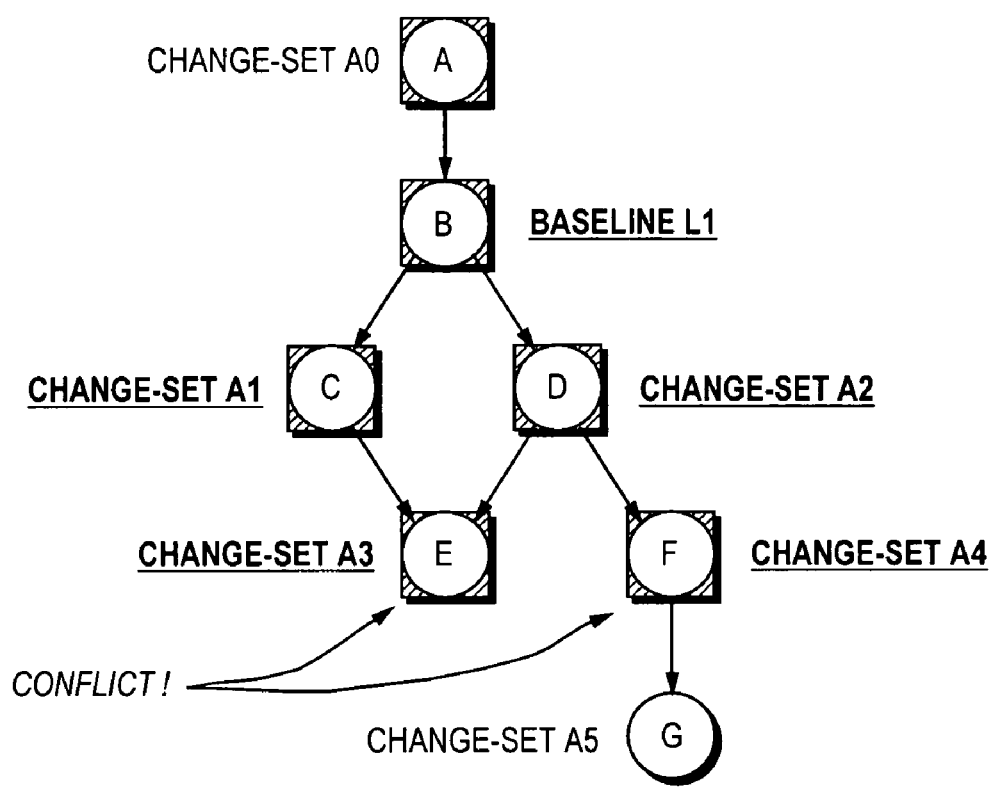

To consider another problematic example, attention is brought to FIG. 4. Suppose a workspace accepts baseline L1 and change-sets A1, A2, A3 and A4 (each shown underlined). This produces an activated version set {A, B, C, D, E, F} shown shaded in FIG. 4. The problem here is that the activated version set does not activate a single version and all its predecessors but rather activates two versions (E and F) and all their respective predecessors. Applicants term this a conflict selection-error. However, unlike a gap selection error, a conflict selection error can be resolved by creating a new version H. In this case, invention system 11 creates new version H as direct successor of versions E and F. That is, invention system 11 merges those versions E and F using version D (the nearest common ancestor) as the base of the merge, and produces new version H. Version H is then employed or utilized as part of some new or existing change-set which the workspace includes in its configuration.

Figure 5:
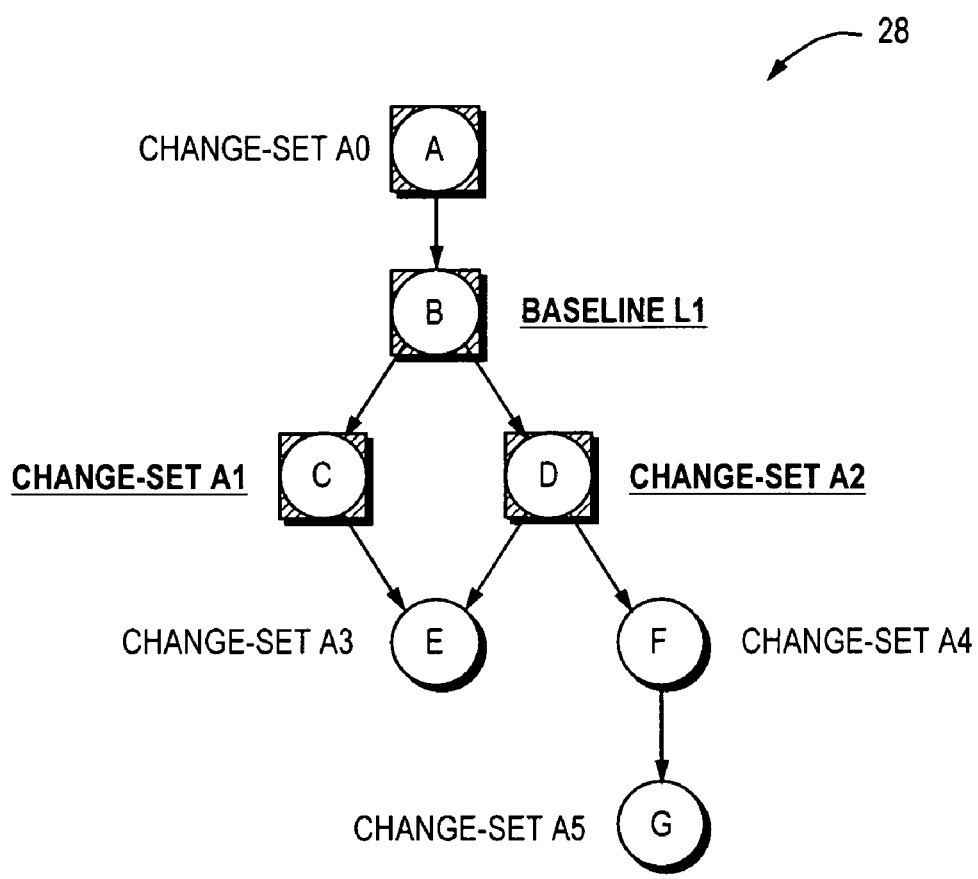

A similar conflict selection error occurs if the workspace configuration includes baseline L1, change-set A2 and change-set A2 (underlined), activating the version set {A, B, C, D} as illustrated shaded in FIG. 5. However, in this case, the error is resolved by accepting change-set A3 into the workspace, making the activated version set {A, B, C, D, E}. As a result, the workspace (through invention system 11) selects version E.

Project Baselines in ABVS

Since multiple baselines of the same project history can appear in a workspace configuration, the invention ABVS system 11 is also used to determine which baseline of a project history to select for a workspace. Although ABVS for project histories is conceptually analogous to that for artifact histories, it has a couple of key differences.

The first difference is that composite baselines graphs add the sub-baselines of activated baselines as new activated baselines, and then ABVS 11 is used to select a baseline from the new set of activated baselines. This selected baseline is then used to select versions from artifact histories.

The second difference is that no gap selection errors can occur during baseline selection. This is important because a baseline can have members that are earlier than the members of its predecessor, and thus it is incorrect to say that a baseline must include everything that its predecessors include. In fact, the whole point of a new baseline might be to roll back some changes in a previous baseline.

Baseline conflict selection errors are still possible, though. If conflict errors arise during baseline selection, the baselines that conflict must be merged or the workspace must be reconfigured to accept different baselines or activities before a new baseline of the project can be created.

Example ABVS System 11 Rules

In a preferred embodiment, the activity-based version selection system 111 of the present invention is implemented or specified as a sequence of rules. Each rule has a set of conditions and a set of actions. If all conditions of a rule are satisfied, the actions of that rule are executed. A rule is executed as many times as possible before the next (succeeding) rule in the sequence is executed.

Basis: A workspace W accepts a set of project baselines and activity change-sets.

Baseline Rules

If W accepts baseline B, does not accept any successor of B, then W activates B and each sub-baseline of B.

If W activates baseline B of project P and does not activate any successor of B, then W selects B.

Change-Set Rules

If W accepts change-set C of activity A, and does not accept any successor of C, then W activates C.

If W activates change-set C of activity A and does not activate any successor of C, then W selects C.

Version rules

If W selects only one baseline B of a project and B refers to version V, then W activates V and each predecessor of V.

If W selects a change-set C, and version V is a product of C, then W activates V.

If W activates a version V of an artifact history H, and W activates all predecessors of V, then W selects and displays V.

Baseline Selection-Errors

Conflict: Multiple baselines of the same project are selected.

Version Selection-Errors

Conflict: Multiple versions of the same artifact are selected. Resolve (as described above) by merging the multiple versions using the nearest common ancestor version as the base of the merge.

Gap: An activated version has a predecessor that is not activated. Resolve as described above by providing to the user a list of change-sets that if added eliminate the gap.

Figure 6:
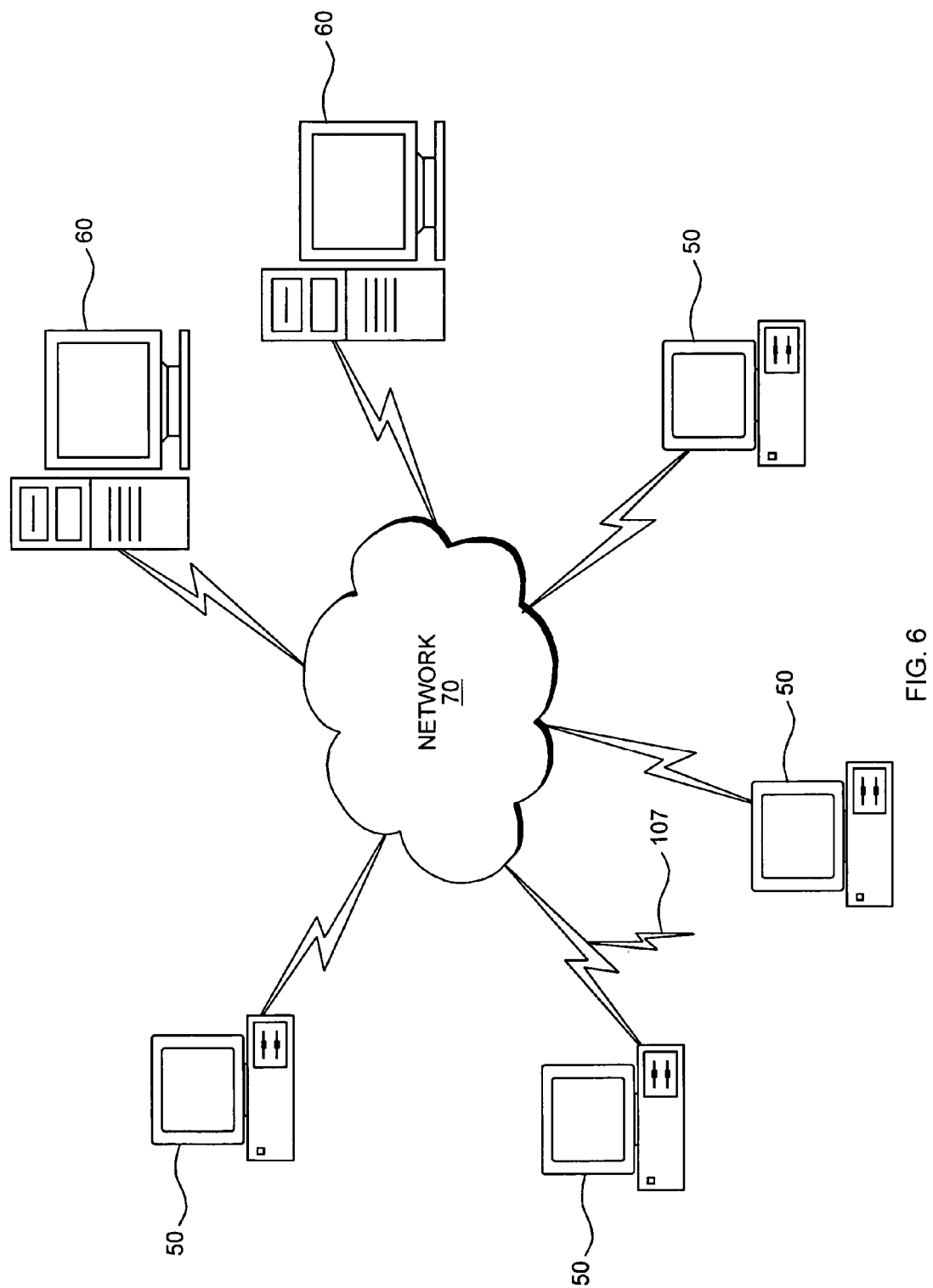
FIG. 6 is a schematic illustration of a computer network environment in which embodiments of the present invention are operated.

FIG. 6 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 7:
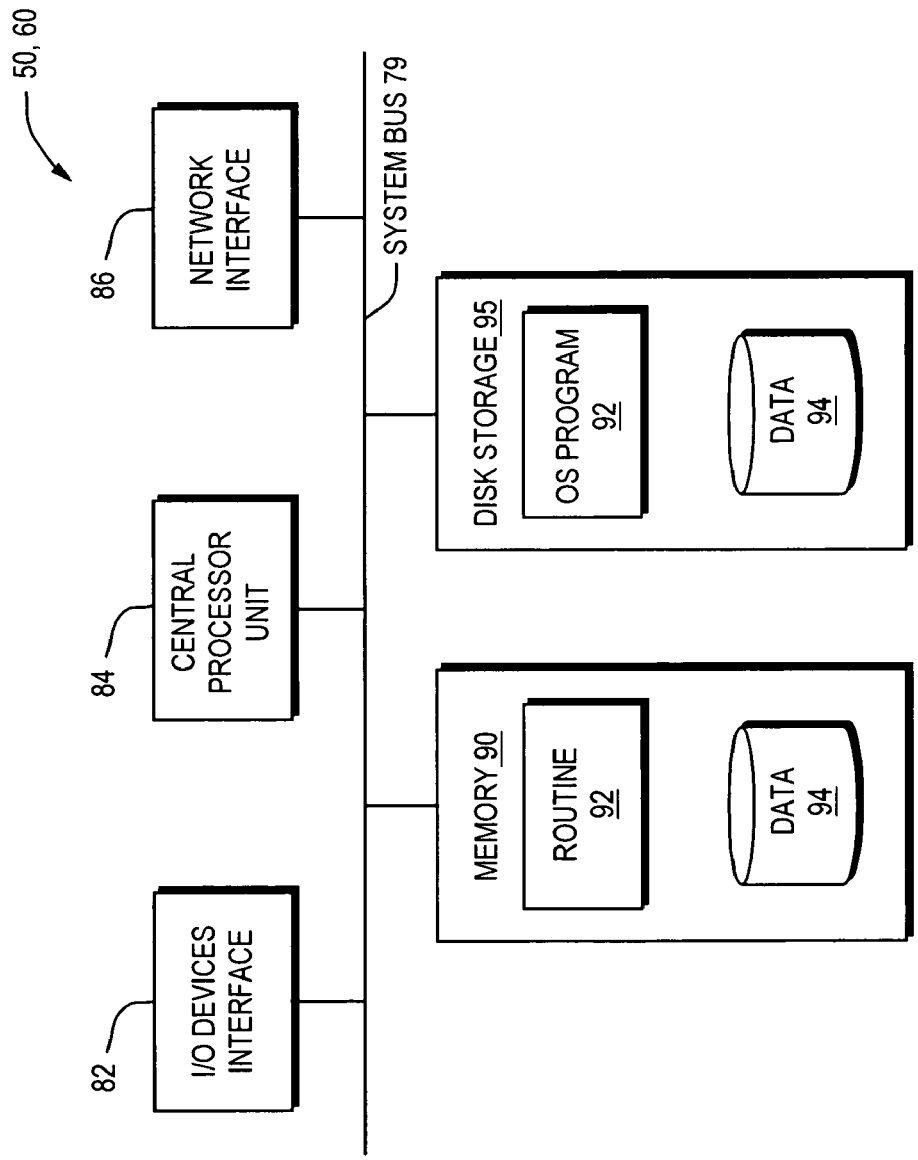
FIG. 7 is a block diagram of one computer node of the network of FIG. 6.

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment of the present invention (e.g., artifact history graphs (or similar baseline and change set data per artifact) 28, baseline rules, version Rules, selection-errors considerations and system 11 routines enabling workspace selection of artifact versions detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to preferred embodiments thereof, it will be understood by those skilled in the art that various changes in form and details may be made therein without departing from the scope of the invention encompassed by the appended claims.

For example, the computer architecture and network configuration of FIGS. 6 and 7 are for purposes of illustration and not limitation. Other computer architectures and configurations are suitable.

Further, artifact history graphs 28 indicating change sets, baselines (project) and artifact versions of a subject workspace may be implemented as linked lists, data arrays, tree structures, objects or other programming structures known in the art.

What is claimed is:

1. A method of selecting software program artifact version, comprising the computer implemented steps of:
   in a computer:
   (a) enabling user development of a configuration of a subject software program in a user workspace, the subject software program configuration having a group of artifacts, and the user workspace being different from an artifact history file system storing persisted versions of the artifacts;
   (b) during said development, indicating a baseline version of each artifact in the subject software program configuration, said indicating resulting in a baseline indication in the user workspace;
   (c) providing respective activity change-set information per artifact in the subject software program configuration, said activity change-set information being indicative of activity in the user workspace,
   wherein, for one of the artifacts in the group, the subject software program configuration in the user workspace references one version stored in the artifact history file system as being the baseline version of the one artifact, and references a different version stored in the artifact history file system as being in at least one change-set of the one artifact, such that, during said development, the subject software program configuration in the user workspace references multiple different versions of the one artifact;
   further in the computer:
   (d) determining which one of the referenced multiple different versions of the one artifact to access in the artifact history file system upon a user accessing the one artifact in the user workspace, said determining being by the computer performing activity-based version selection of said one artifact, said computer performing using together the baseline indication and the activity change-set information to automatically determine and select, from the artifact history file system, a version of the one artifact among the multiple different versions referenced in the subject software program configuration in the user workspace, and said computer performing the activity-based version selection includes resolving any version selection error by users having used multiple versions of the one artifact during development of the subject software program configuration in the user workspace, said resolving merging versions in the artifact history file system or accepting certain change-sets into the user workspace; and
   displaying to the user the automatically determined and selected version of the given artifact.

2. A method as claimed in claim 1 wherein the baseline indication effectively serves as a project starting point and each activity change-set information represents deltas from that starting point.

3. A method as claimed in claim 1 wherein the step of providing respective activity change-set information includes employing a respective artifact history graph for each artifact, wherein for a given artifact, the respective artifact history graph including indications of different versions of the given artifact and corresponding change sets for the different versions.

4. A method as claimed in claim 3 wherein the step of performing activity-based version selection includes:
   for each accepted change set indicated in the artifact history graph of the artifact, activating the corresponding version indicated in the graph; and
   where the activated versions form a continuous sub-graph represented as one version and all predecessor versions to the one version, defining the one version to be the automatically determined and selected version of the artifact.

5. A method as claimed in claim 3 wherein the step of indicating a baseline version utilizes the respective artifact history graph of each artifact.

6. A method as claimed in claim 1 wherein the automatically determining and selecting includes:
   (i) if there is only one baseline and the baseline refers to a certain version of the artifact, then activating the certain version and each predecessor version;
   (ii) if a version is a product of an accepted change set, then said determining includes activating this version; and
   (iii) if any one version of (i) and (ii) is activated and all its predecessor versions are activated, then select said any one version.

7. A method as claimed in claim 1 further comprising the step of:
   given multiple baselines of a same project history, determining one of the baselines for use; and
   said step of indicating being based on the determined one baseline.

8. A method as claimed in claim 7 wherein said step of determining one of the baselines includes:
   for each accepted baseline that does not have any successor baselines accepted, activating the accepted baseline and each of its sub-baselines; and
   for an activated baseline that does not have any activated successor baselines, defining the activated baseline as the determined one baseline.

9. Computer apparatus for selecting software program artifact version, comprising:
   a user workspace enabling development of a configuration of a subject software program, the configuration of the subject software program having a plurality of artifacts, and the user workspace being different from an artifact history file system storing persisted versions of the artifacts;
   a baseline indicator for indicating, during said development, a baseline version of each artifact in the subject software program configuration in the user workspace;
   a data member providing activity change-set information per artifact in the subject software program configuration, wherein the activity change-set information is indicative of activity in the user workspace; and
   a processor routine, in processor memory and executable by a processor, that performs activity-based version selection of artifacts in the subject software program configuration, wherein, for one of the artifacts in the plurality, the subject software program configuration during said development in the user workspace references multiple different versions of the one artifact as stored in the artifact history file system, including the subject software program configuration referencing one version stored in the artifact history file system as being the baseline version of the one artifact and referencing a different version stored in the artifact history file as being in at least one change-set of the one artifact, the processor routine determining which one of the referenced multiple different versions of the one artifact to access in the artifact history file system when a user accesses the one artifact in the user workspace and resolving version selection error by users having used multiple versions of the one artifact during development of the subject software program configuration in the user workspace, the processor routine using together the indicated baseline versions and activity change-set information to automatically determine and select from the artifact history file system, version of the one artifact among the multiple different versions referenced in the subject software program configuration in the user workspace, said determining and resolving merging versions in the artifact history file system or accepting certain change-sets into the user workspace, the processor routine enabling display of the automatically determined version of the one artifact to the user.

10. Apparatus as claimed in claim 9 wherein the indicated baseline version effectively serves as a project starting point and each activity change-set information represents deltas from that starting point.

11. Apparatus as claimed in claim 9 wherein the baseline indicator and data member are implemented as a respective artifact history graph of each artifact, wherein for a given artifact, the respective artifact history graph includes indications of different versions of the given artifact and corresponding change sets for the different versions.

12. Apparatus as claimed in claim 11 wherein the processor routine further:
   for each accepted change set indicated in the artifact history graph of the artifact, activates the corresponding version indicated in the graph; and
   where the activated versions form a continuous sub-graph represented as one version and all predecessor versions to the one version, defines the one version to be the determined version of the artifact.

13. Apparatus as claimed in claim 9 wherein the processor routine is rules-based.

14. Apparatus as claimed in claim 13 wherein the rules for the processor routine determining version of an artifact include:
   (i) if there is only one baseline and the baseline refers to a certain version of the artifact, then said determining includes activating the certain version and each predecessor version;
   (ii) if a version is a product of an accepted change set, then said determining includes activating this version; and
   (iii) if any one version of (i) and (ii) is activated and all its predecessor versions are activated, then said determining selects said any one version.

15. Apparatus as claimed in claim 9 wherein the processor routine further:
   determines and selects one baseline from multiple given baselines of a same project; and
   for each of the multiple given baselines, provides respective indications of baseline versions.

16. Apparatus as claimed in claim 15 wherein the processor routine determines the one baseline by:
   for each accepted baseline that does not have any successor baselines accepted, activating the accepted baseline and each of its sub-baselines; and
   for an activated baseline that does not have any activated successor baselines, defining the activated baseline as the determined one baseline.

17. An artifact version selector for a configuration management system comprising:
   a user workspace enabling development of a configuration of a subject software program, the configuration of the subject software program having a plurality of artifacts, and the user workspace being different from an artifact history file system storing persisted versions of the artifacts;
   the user workspace having configuration management means configured to indicate during said development, (a) a baseline version of each artifact in the subject software program configuration in the user workspace, and (b) respective change-set information per artifact in the subject software program configuration, different change sets corresponding to different versions of the artifacts, and the change-set information being indicative of activity in the user workspace; and processor means for, during said development, automatically determining and selecting version of an artifact in the user workspace among the different versions in the subject software program configuration by activity-based version selection, wherein for one of the artifacts in the plurality the subject software program configuration during said development in the user workspace references multiple different versions of the one artifact as stored in the artifact history file system, the processor means determining which one of the referenced multiple different versions of the one artifact to access in the artifact history file system, when a user accesses the one artifact in the workspace, the processor means performing activity-based version selection to resolve version selection errors by users having used multiple versions of the one artifact during development of the subject software program configuration in the user workspace, said processor means performing activity-based version selection by using both the indicated baseline versions and the change-set information, said automatic determining and selecting by the processor means merging versions in the artifact history file system or accepting certain change sets into the user workspace;

said processor means enabling the configuration management system to display the automatically determined and selected version of the given artifact to a user.

18. An artifact version selector as claimed in claim 17 wherein the processor means further:

for each accepted change set indicated by the artifact history means, activates a corresponding version; and where the activated versions form a set of versions representable as one version and all its predecessor versions, defines the one version to be the determined version.

19. An artifact version selector as claimed in claim 17 wherein the processor means is rules-based.

20. A computer program product comprising:

a computer readable storage medium including computer usable program code for selecting software program artifact version, said computer usable program code including:

computer usable program code for enabling development of a configuration of a subject software program in a user workspace, the configuration of the subject software program having a plurality of artifacts, and the user workspace being different than an artifact history file system storing persistent versions of the artifacts;

computer usable program code for indicating, during said development, a baseline version of one of the artifacts in the plurality of artifacts in the subject software program configuration in the workspace;

computer usable program code for providing information about change sets of the one artifact, different change sets corresponding to different versions of the one artifact and the information about change sets being indicative of activity in the user workspace;

wherein the subject software program configuration during said development in the user workspace references multiple different versions of the one artifact as stored in the artifact history file system including the subject software program configuration referencing one version stored in the artifact history file system as being the baseline version of the one artifact and references a different version stored in the artifact history file system as being in at least one change-set of the one artifact, computer usable program code for determining which one of the multiple different referenced versions of the one artifact to access in the artifact history file system when a user accesses the one artifact in the user workspace, and for resolving version selection error by users having used multiple versions of the one artifact during development of the subject software program configuration in the user workspace, said computer useable program code for determining and resolving automatically determining and selecting from the artifact history file system version for the one artifact among the multiple different versions referenced in the user workspace as a function of user interaction with the subject software program configuration and activity in the user workspace, said computer usable program code employing both the indicated baseline version and change-set information for said determining, said determining and resolving merging versions in the artifact history file system or accepting certain change-sets into the user workspace; and computer usable program code for enabling display of the one artifact in the automatically determined version in the subject software program configuration.

\* \* \* \* \*